US006944712B2

(12) United States Patent
Weber et al.

(10) Patent No.: US 6,944,712 B2
(45) Date of Patent: Sep. 13, 2005

(54) METHOD AND APPARATUS FOR MAPPING STORAGE PARTITIONS OF STORAGE ELEMENTS FOR HOST SYSTEMS

(75) Inventors: Bret S. Weber, Wichita, KS (US); Russell J. Henry, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 297 days.

(21) Appl. No.: 10/315,326

(22) Filed: Dec. 10, 2002

(65) Prior Publication Data

US 2004/0111580 A1 Jun. 10, 2004

(51) Int. Cl.[7] .................................................. G06F 13/14
(52) U.S. Cl. .................................................. 711/114
(58) Field of Search ................................ 711/114, 154, 711/170

(56) References Cited

U.S. PATENT DOCUMENTS 6,029,231 A * 2/2000 Blumenau .................. 711/162
6,460,123 B1 * 10/2002 Blumenau .................. 711/162
6,718,436 B2 * 4/2004 Kim et al. .................. 711/114

* cited by examiner

*Primary Examiner*—Kevin L. Ellis
(74) *Attorney, Agent, or Firm*—Duft Bornsen & Fishman, LLP

(57) ABSTRACT

System and methods for managing requests of a host system to physical storage partitions. A storage system includes a plurality of storage elements with each storage element configured for providing data storage. A communications switch is communicatively connected to the storage elements for transferring requests to the physical storage partitions. A host system includes a storage router for mapping a portion of the physical storage partitions to logical storage partitions such that the host system can directly access the portion via the requests. Each of the storage elements includes a storage controller configured for processing the requests of the host system. The storage elements also include any of a disk storage device, tape storage device, CD storage device, and a computer memory storage device.

18 Claims, 3 Drawing Sheets

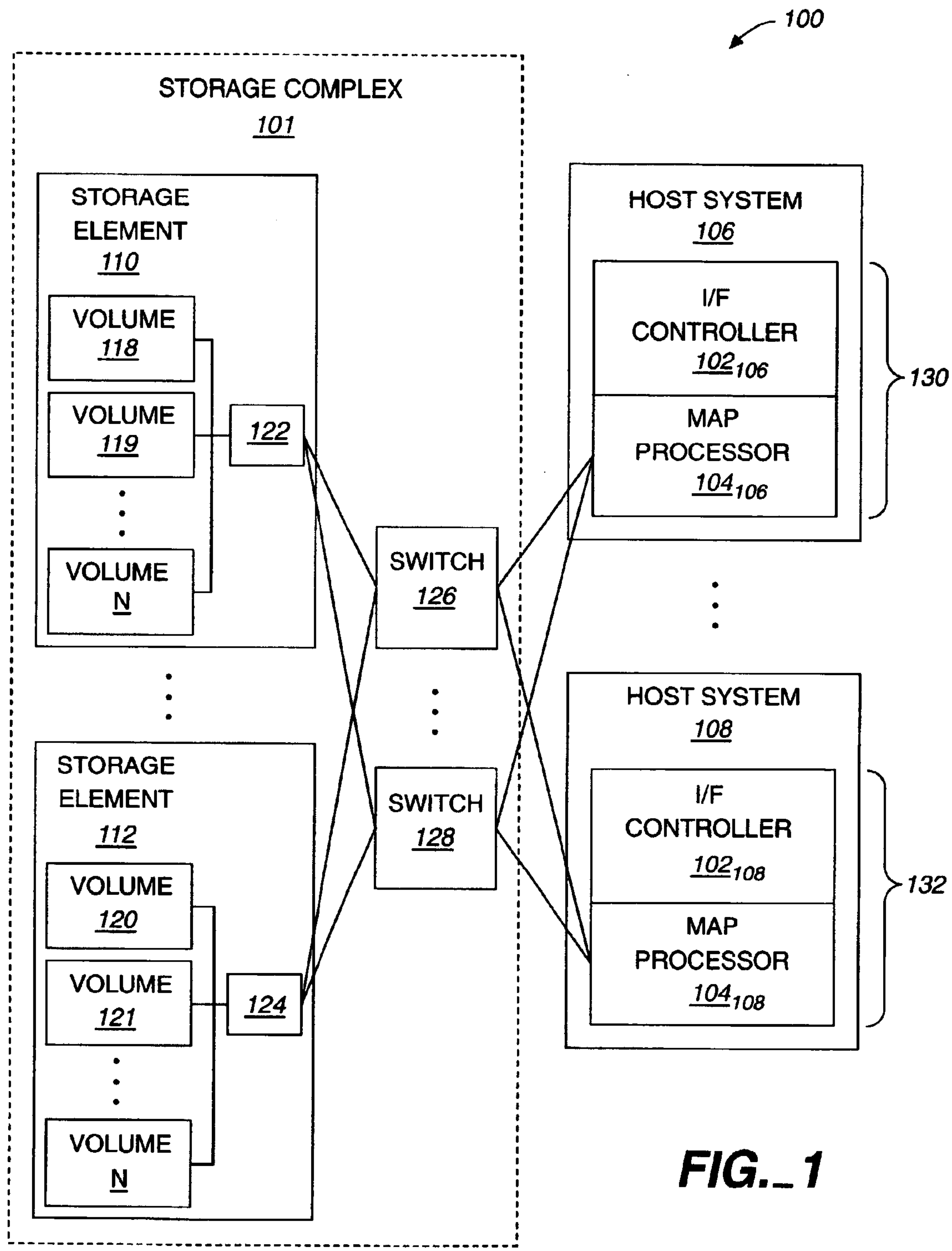
FIG._1

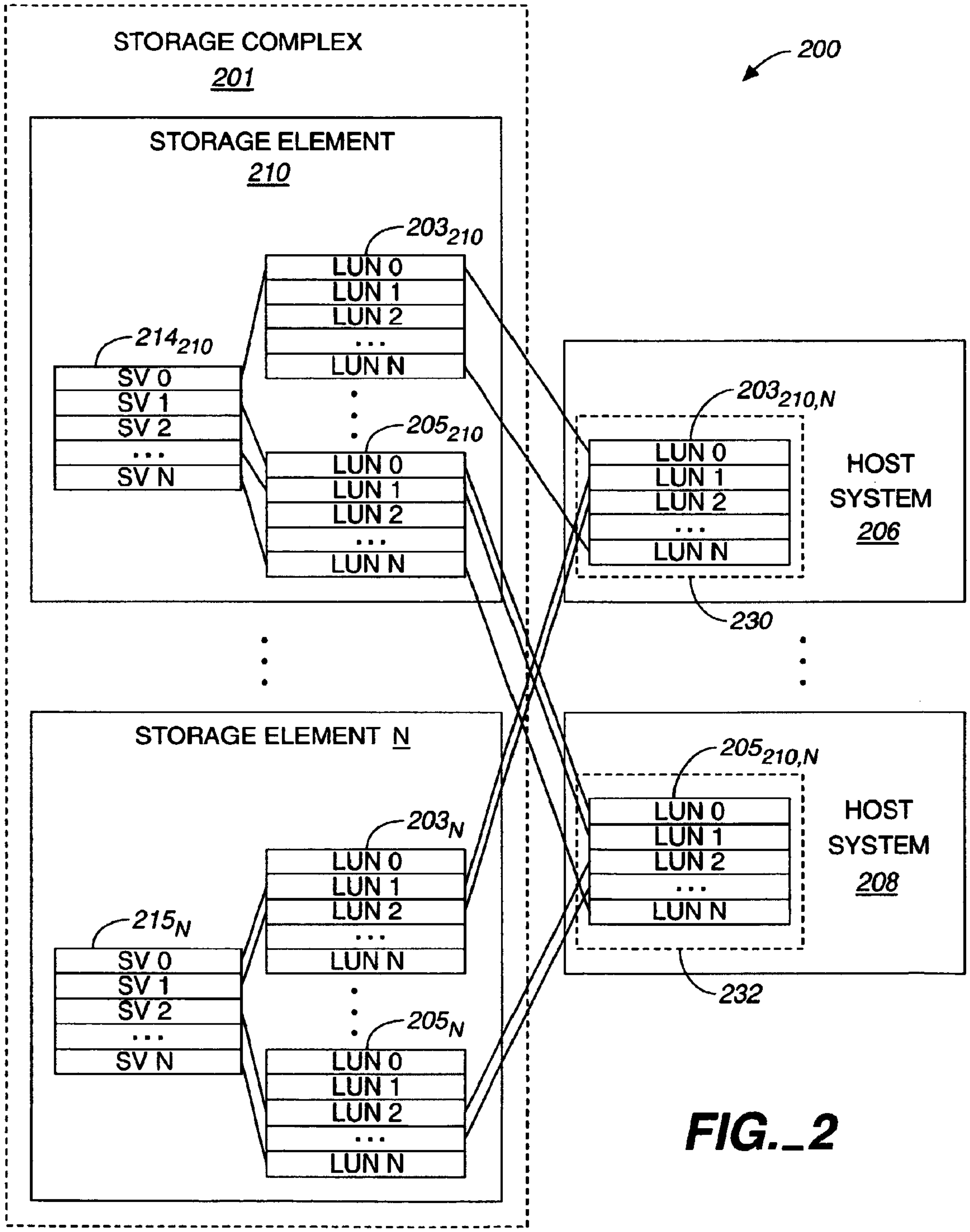
FIG._2

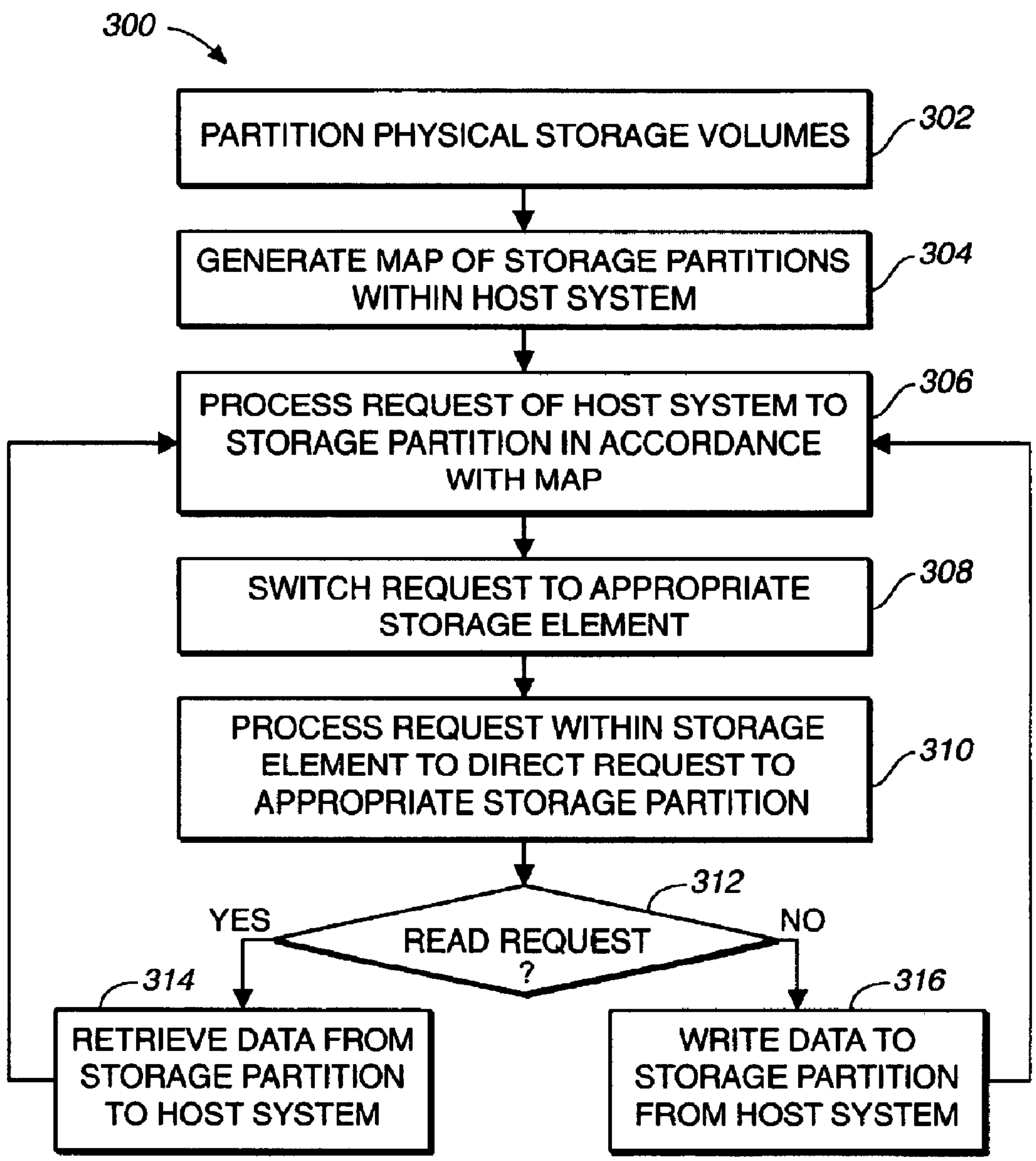
FIG._3

METHOD AND APPARATUS FOR MAPPING STORAGE PARTITIONS OF STORAGE ELEMENTS FOR HOST SYSTEMS

BACKGROUND OF THE INVENTION

1. Field of the Invention

The present invention is generally directed toward mapping storage partitions of storage elements for host systems. More specifically, the present invention relates to abstracting storage partition mapping from the storage elements into host systems.

2. Discussion of Related Art

Large storage systems typically include storage elements that comprise either a single storage device or an array of storage devices. The individual storage devices are accessed by host systems via Input/Output (I/O) requests, such as read and write requests, through one or more storage controllers. A user accessing the disks through the host system views the multiple disks as a single disk. One example of a large storage system includes a Redundant Array Of Independent Disks (RAID) storage system that has one or more logical units (LUNs) distributed over a plurality of disks. Multiple LUNs are often grouped together in storage partitions. Each storage partition is typically private to a particular host system, thus, LUNs of a particular storage partition are also private to the particular host system. Examples of the host systems include computing environments ranging from individual personal computers and workstations to large networked enterprises encompassing numerous, heterogeneous types of computing systems. A variety of well-known operating systems may be employed in such computing environments depending upon the needs of particular users and enterprises. Disks in such large storage systems may include standard hard disk drives as often found in personal computers as well as other types of storage devices such as optical storage, semiconductor storage (e.g., Random Access Memory disks, or RAM disks), tape storage, et cetera.

Large storage systems have a finite capacity that may be scaled up or down by adding or removing disk drives as deemed necessary by the amount of needed storage space. However, since the capacity is finite, storage space of the storage system is limited to a maximum number of disks that can be employed by a particular storage system. Once the limit of disks is reached, storage space of the storage system can only be increased by replacement of the residing disks with disks that have more storage space, assuming the storage controller of the storage system allows higher capacity disks. Such a process is limited by disk technology advancements or by capabilities of the storage controller. However, many organizations demand larger storage capacity and cannot wait for these disk technology advancements or for changes to the storage controllers within the storage system.

One solution attempts to address the problem by employing multiple storage systems to increase the storage capacity. The storage capacity problem is, thus, simply solved through the scaling of storage space by the number of storage systems. However, the storage systems operate independently and, therefore, mandate that users access information of each storage system independently. As more storage capacity is employed, management of the information on multiple storage systems becomes cumbersome.

Organizations often demand increases to their storage capacity. For example, organizations that continually grow in size and technology have an ever-changing need to document and maintain information. These organizations also demand that the increases to their storage capacity be rapidly and easily implemented such that the stored information is rapidly accessible and flexibly configured for access within the organization. An unmanageable storage network of independent storage systems may impede or even prevent the management of the information stored in the storage systems. As evident from the above discussion, a need exists for improved structures and methods for managing data storage.

SUMMARY OF THE INVENTION

The present invention solves the above and other problems and advances the state of the useful arts by providing apparatus and methods for managing requests of a host system to a plurality of storage elements with each storage element comprising physical storage partitions configured for providing data storage. More specifically, the invention incorporates, within the host systems, mapping to the physical storage partitions such that the host system can process requests directly to the physical storage partitions.

In one exemplary preferred embodiment of the invention, the host systems provide for generating, maintaining and using merged partitions, such as those described in U.S. patent application Ser. No. 10/230,735, filed 29 Aug. 2002, hereby incorporated by reference.

In one exemplary preferred embodiment of the invention, each host system processes its requests to the physical storage partitions of one or more storage elements through an internal communication interface. Each storage element may include one or more storage volumes, such as an array of storage volumes. The storage elements can be combined to form a storage complex and can provide data storage to a plurality of host systems. The storage volumes can include any type of storage media including magnetic disk, tape storage media, CD and DVD optical storage (including read-only and read/write versions), and semiconductor memory devices (e.g., RAM-disks).

The communication interface includes a map processor and an interface controller. The interface controller processes the requests of the host system to the physical storage partitions. The map processor maps the physical storage partitions of each storage element to logical partitions within the host system such that the host system can directly access the physical storage partitions via the requests. Together, the interface controller and the map processor may incorporate functionality of a storage router capable of routing the requests of the host system directly to the physical storage partitions based on the "mapped" logical partitions.

In one exemplary preferred embodiment of the invention, a storage system includes a plurality of storage elements, each storage element configured for providing data storage. The system also includes a communications switch communicatively connected to the plurality of storage elements for transferring requests to the plurality of storage elements and a host system including a storage router for mapping a portion of the physical storage partitions to logical storage partitions such that the host system can directly access the portion via the requests.

In another exemplary preferred embodiment of the invention, each of the storage elements includes at least one of a disk storage device, tape storage device, CD storage device, and a computer memory storage device.

In another exemplary preferred embodiment of the invention, the storage elements include a storage controller configured for processing the requests of the host system.

In another exemplary preferred embodiment of the invention, the requests include read and write requests to the physical storage partitions.

In one exemplary preferred embodiment of the invention, a method provides for managing requests of a host system to a plurality of storage elements, each storage element comprising physical storage partitions configured for providing data storage. The method includes steps, within the host system, of mapping a portion of the physical storage partitions to logical storage partitions such that the host system can directly access the portion via the requests, and processing the requests of the host system to the portion in response to mapping the portion. The method also includes a step of switching the requests to the portion in response to processing the requests.

In another exemplary preferred embodiment of the invention, the step of mapping includes a step of generating a merged partition of the storage elements such that the requests are switched based on the merged partition.

In another exemplary preferred embodiment of the invention, the method includes a step of privatizing an access for the host system through the merged partition to the portion of the physical storage partitions.

In another exemplary preferred embodiment of the invention, the method includes a step of processing the requests as read and write requests to the portion of the physical storage partitions.

In another exemplary preferred embodiment of the invention, the method includes a step of partitioning data storage space to generate the physical storage partitions of each storage element.

In another exemplary preferred embodiment of the invention, the method includes a step of mapping the physical storage partitions of each storage element to one or more storage volumes within each respective storage element.

In another exemplary preferred embodiment of the invention, the method includes a step of accommodating multiple host systems with the method of managing.

Advantages of the invention include an abstraction of mapping from the storage element to a communication interface resident within with the host system. The abstraction, thus, relieves the storage element of a processor intense function. Other advantages include improved storage management and flexibility as a storage system increases beyond a single storage element.

BRIEF DESCRIPTION OF THE PREFERRED EMBODIMENTS

FIG. 1 is a block diagram illustrating an exemplary preferred embodiment of the invention.

FIG. 2 is a block diagram illustrating another exemplary preferred embodiment of the invention.

FIG. 3 is a flow chart diagram illustrating an exemplary preferred operation of the invention.

DETAILED DESCRIPTION OF THE PREFERRED EMBODIMENTS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 1, an exemplary preferred embodiment of the invention is shown in system 100. System 100 includes storage complex 101 that provides data storage to a host system, such as host systems 106 and 108. Examples of a host system include computing environments ranging from individual personal computers and workstations to large networked enterprises encompassing numerous, heterogeneous types of computing systems. A variety of well-known operating systems may be employed in such host systems depending upon the needs of particular users and enterprises.

Storage complex 101 may represent a network of N number of storage elements (e.g., storage elements 110 and 112), where N is an integer greater than zero, such as that found in a storage area network (SAN). Each storage element includes N number of storage volumes (e.g., storage volume 118, 119, 120, and 121). These storage volumes provide physical storage space for data and can include any of a standard hard disk drives, such as those often found in personal computers, optical storage, semiconductor storage (e.g., RAM disks), tape storage, et cetera.

Typically, a system administrator (i.e., a user) partitions the storage elements into physical storage space partitions, described in greater detail in FIG. 2. Each of these physical storage partitions can encompass any amount of actual physical storage space occupied by a particular storage element. For example, one partition can include storage space of one or more storage volumes, while another partition can include storage space of less than one entire storage volume.

Each storage element (e.g., storage elements 110 and 112) has one or more storage element controllers, such as storage element controllers 122 and 124. The storage element controllers process received requests to access the physical storage partitions. These accesses include a variety of access types such as read and write requests to the storage partitions and control requests to manage the storage volumes. Examples of the storage element controllers may include present day RAID storage controllers. As such, the storage elements may be configured to according to RAID methods. However, system 100 is not intended to be limited to RAID techniques.

In system 100, the storage complex includes a plurality of communication switches, such as switches 126 and 128. Each of these communication switches transfers the requests to any of the storage elements that are connected as determined by the host system. Communication switches, such as switches 126 and 128 are known.

A host system, such as host systems 106 and 108, connects to one or more of the switches through a communication interface, such as communication interfaces 130 and 132. The communication interface includes an interface controller and a map processor, such as interface controller $\mathbf{102}_{106}$ and map processor $\mathbf{104}_{106}$. The interface controller and the map processor, together, incorporate the functionality of a storage router. As used herein, a storage router is functionality of the communication interface that directs, or routes, the requests of a host system, such as host systems 106 and 108, through communications switches 126 and 128 to the physical storage partitions of storage elements 110 and 112.

The map processor maps the storage partitions of each storage element to generate one or more mapped partitions of the storage elements. These mapped partitions are logical representations of the physical storage partitions and may include merged partitions. The interface controller processes the requests to the physical storage partitions on behalf of the host system according to the mapped partitions such that the host system can directly access the physical storage partitions of the storage elements.

The host systems access the physical storage partitions through a variety of connections, such as Fibre Channel (FC), Small Computer System Interface (SCSI), Internet SCSI (ISCSI), Ethernet, Infiniband, SCSI over Infiniband (e.g., SCSI Remote Direct Memory Access Protocol, or SRP), piping, and/or various physical connections (Infiniband is an architecture and specification for data flow between processors and I/O devices). The communication interface is adaptable to employ any of such interfaces so that the host system can flexibly communicate with the storage partitions via the mapped partitions.

FIG. 2 is a block diagram of system 200 in another exemplary preferred embodiment of the invention. System 200 is configured for processing requests of one or more host systems, such as host systems 206 and 208, to one or more physical storage partitions, such as storage partitions $\mathbf{203}_{210}$, $\mathbf{205}_{210}$, $\mathbf{203}_N$, and $\mathbf{205}_N$, of one or more storage elements, such as storage elements 210 . . . N, within storage complex 201. In system 200, communication interfaces 230 and 232 respectively include merged partitions $\mathbf{203}_{210,N}$ and $\mathbf{205}_{210,N}$, which map to storage partitions $\mathbf{203}_{210}$, $\mathbf{205}_{210}$, $\mathbf{203}_N$, and $\mathbf{205}_N$ of storage elements 210 . . . N, where N is an integer value greater than zero.

In system 200, host systems 206 and 208 can directly access the storage partitions through respective mappings of merged partitions $\mathbf{203}_{210,N}$ and $\mathbf{205}_{210,N}$. Each communication interface processes the requests of its respective host system to designated storage partitions using merged partitions. A user, such as a system administrator, may perform allocation of storage space for these storage partitions prior to use. Storage partitions $\mathbf{203}_{210}$, $\mathbf{205}_{210}$, $\mathbf{203}_N$, and $\mathbf{205}_N$ may be created by allocating sections of storage space across one or more storage volumes.

Each merged partition $\mathbf{203}_{210,N}$ and $\mathbf{205}_{210,N}$ may include a plurality of LUN designators that are used to process requests from its respective host system by mapping the requests to the LUNs within one or more of the storage elements. The requests may be mapped through either logical mapping and/or physical mapping. While LUNs of the partitions of each storage element are merged into the merged partitions of a particular communication interface of the host system, LUN usage is not duplicated between storage elements. For example, LUN 0 of storage partition $\mathbf{203}_{210}$ is merged into merged partition $\mathbf{203}_{210,N}$, while LUN 0 of storage partition $\mathbf{205}_N$ is not. Such an allocation may prevent conflicts between LUN selections by the host systems. However, other embodiments, particularly those not employing such merged partitions, may not be limited to this particular type of LUN usage.

In system 200, storage element 210 includes storage partitions $\mathbf{203}_{210}$ and $\mathbf{205}_{210}$ and storage element N includes storage partitions $\mathbf{203}_N$ and $\mathbf{205}_N$. Partitions $\mathbf{203}_{210}$, $\mathbf{205}_{210}$, $\mathbf{203}_N$, and $\mathbf{205}_N$ may include one or more LUNs, such as LUNs 0, 1 . . . N, where N is an integer greater than zero. Each LUN designates a private allocation of storage space for a particular host system within a particular storage partition. Each LUN may map to a LUN designator within the communication interfaces of their respective host systems. Storage partitions $\mathbf{203}_{210}$, $\mathbf{205}_{210}$, $\mathbf{203}_N$, and $\mathbf{205}_N$ should not be limited to a specific type of LUN allocation as storage partitions $\mathbf{203}_{210}$, $\mathbf{205}_{210}$, $\mathbf{203}_N$, and $\mathbf{205}_N$ may employ other types of storage space sectioning.

In system 200, storage element 210 includes array $\mathbf{214}_{210}$ of storage volumes and storage element N includes array $\mathbf{215}_N$ of storage volumes. Each of arrays $\mathbf{214}_{210}$ and $\mathbf{215}_N$ may include storage volumes SV 0, SV 1 . . . SV N, where N is an integer greater than zero. In one embodiment of the invention, multiple LUNs of the storage partitions may map to one or more storage volumes. Storage volumes SV 0, SV 1 . . . SV N may include storage devices, such as standard hard disk drives as often found in personal computers, as well as other types of storage devices, such as optical storage, semiconductor storage (e.g., RAM disks), tape storage, et cetera. Arrays $\mathbf{214}_{210}$ and $\mathbf{215}_N$ are not intended to be limited to a number or type of storage volumes within each array. For example, storage array $\mathbf{214}_{210}$ may include a single computer disk, while storage array $\mathbf{215}_N$ includes a plurality of tape drives.

In system 200, host systems 206 and 208 initiate access to storage elements 210 . . . N. For example, host system 206 may request data from storage partition $\mathbf{203}_{210}$ through merged partition $\mathbf{203}_{210,N}$, as generated by a map processor, such as map processor $\mathbf{104}_{106}$ of FIG. 1. An interface controller, such as interface controller $\mathbf{102}_{106}$ of FIG. 1, processes the request to direct the request to storage partitions $\mathbf{203}_{210}$ of storage elements 210. A storage controller, such as storage controller 122 of FIG. 1, processes the request to an appropriate storage partition as determined by the request. Since the storage partition may occupy physical storage space on one or more of the storage volumes of a storage array, the storage controller may process the request to more than one storage volume of the storage array.

In a more specific example, host system 206 may access LUN 0 of merged partition $\mathbf{203}_{210,N}$ using either a read or a write request. The interface controller of the host system processes the request by directing the request to LUN 0 of storage partition $\mathbf{203}_{210}$ of storage element 210. The storage controller further processes the request by directing the request to storage volume SV 0 of storage array $\mathbf{214}_{210}$, and, thus, creating a direct access of data from storage partition $\mathbf{203}_{210}$ to host 206.

While the preceding examples of system 200 illustrate mapping and processing requests from a host system to a physical storage partition in accord with one embodiment of the invention, the examples are not intended to be limiting. Those skilled in the art understand that other combinations of mapping requests between a host system and a storage volume will fall within the scope of the invention.

FIG. 3 illustrates an exemplary preferred operation 300 of a storage system similar the storage system 100 of FIG. 1 and storage system 200 of FIG. 2. Operation 300 details one methodical embodiment of how the storage system may process requests of a host system (e.g., host system 206 of FIG. 2) to storage partitions (e.g., storage partitions $\mathbf{203}_{210}$, $\mathbf{205}_{210}$, $\mathbf{203}_N$, and $\mathbf{205}_N$ of FIG. 2).

A user, such as a system administrator, partitions storage volumes (e.g., storage volumes SV 0, SV 1 . . . SV N of FIG. 2), in step 302. A map processor (e.g., map processor $\mathbf{104}_{106}$ of FIG. 1) of a communication interface located within the host system generates a map of the storage partitions, in step 304. The mapped storage partitions may include merged partitions (e.g. merged partitions $\mathbf{203}_{210,N}$ and $\mathbf{205}_{210,N}$ of FIG. 2) of all storage partitions relevant to a particular host system. For example, one host system may only communicate with a few of the storage partitions across multiple storage volumes and storage elements (e.g., storage elements 210-N of FIG. 2). As such, those merged partitions map directly to the physical storage partitions that the host system accesses. Steps 302 and 304 are typically performed prior to storage operations.

Once the storage partitions are created and the map is generated, the host system generates a request intended for the storage partitions. The interface controller (e.g., interface controller $\mathbf{102}_{106}$ of FIG. 1) processes the request and routs it to the appropriate physical storage partition according to the mapped partitions, in step 306. A communication switch (e.g., communication switches 126 and 128 of FIG. 1) switches the request to the appropriate storage element, in step 308. The storage controller (e.g., storage controllers 122 and 124 of FIG. 1) processes the request within the storage element to access the appropriate physical storage partition, in step 310. The storage controller determines if the request is a read request or write request, in step 312. If the request is a read request, the storage controller accesses the appropriate storage partition and retrieves data to the host system making the request, in step 314. If the request is a write request, the controller stores data within the appropriate storage partition, in step 316. Upon completion of either of steps 314 or 316, operation 300 returns step 306 and idles until the host system generates another request.

Operation 300 illustrates one host system communicating to a storage partition. Operation 300 can be expanded to include multiple host systems communicating in a substantially simultaneous manner through the switch. Additionally, the map processor may generate types of logical storage partitions other than merged partitions such that the host system directly accesses the physical storage partitions in other ways. As such, those skilled in the art will understand that other methods can be used to transfer requests between host systems and physical storage partitions that fall within the scope of the invention.

Instructions that perform the operations of FIG. 3 can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

Advantages of the invention include an abstraction of mapping from the storage element to a communication interface resident within with the host system. The abstraction, thus, relieves the storage element of a processor intense function. Other advantages include improved storage management and flexibility as a storage system increases beyond a single storage element.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of managing requests of a host system to a plurality of storage elements, each storage element comprising a plurality of storage devices configured as one or more physical storage partitions configured for providing data storage and each storage element further comprising a storage controller coupled to the storage devices, the method including steps of:

mapping, within the host system, a portion of the physical storage partitions to define at least one logical storage partition such that the host system can directly access the portion via the requests wherein the portion includes at least two physical storage partitions associated with different storage elements each having an associated storage controller;

processing, within the host system, the requests of the host system to the portion in response to mapping the portion; and switching the requests to the portion in response to processing the requests such that the storage controller associated with each of the at least two physical storage partitions each processes part of the requests to the portion independent of the other storage controllers.

2. The method of claim 1, wherein the step of mapping includes a step of generating a merged partition of the storage elements such that the requests are switched based on the merged partition.

3. The method of claim 2, further including a step of privatizing an access for the host system through the merged partition to the portion of the physical storage partitions such that only the host system that generated the merged partition can access the merged partition.

4. The method of claim 1, further including a step of processing the requests as read and write requests to the portion of the physical storage partitions.

5. The method of claim 1, further including a step of partitioning data storage space to generate the physical storage partitions of each storage element.

6. The method of claim 1, further including a step of mapping the physical storage partitions of each storage element to one or more storage volumes within each respective storage element.

7. The method of claim 1, further including a step of accommodating multiple host systems with the method of managing.

8. A storage system, including:

a plurality of storage elements, each storage element configured for providing data storage, each storage element comprising a storage controller coupled to a plurality of storage devices configured as a plurality of physical storage partitions;

a communications switch communicatively connected to the plurality of storage elements for transferring requests to the plurality of storage elements; and a host system coupled to the plurality of storage elements through the communications switch and including a storage router for mapping a portion of the physical storage partitions to logical storage partitions such that the host system can directly access the portion via the requests wherein the portion includes at least two physical storage partitions associated with different storage elements each having an associated storage controller, and wherein the storage controller associated with each of the at least two physical storage partitions each processes part of the requests to the portion independent of the other storage controllers.

9. The system of claim 8, wherein each of the storage elements includes at least one of a disk storage device, tape storage device, CD storage device, and a computer memory storage device.

10. The system of claim 8, wherein the storage elements include a storage controller configured for processing the requests of the host system.

11. The system of claim 8, the requests including read and write requests to the physical storage partitions.

12. A system of managing requests of a host system to a plurality of storage elements, each storage element comprising a plurality of storage devices configured as one or more physical storage partitions configured for providing data storage and each storage element further comprising a storage controller coupled to the storage devices, the system including:

means, within the host system, for mapping a portion of the physical storage partitions to define at least one logical storage partition such that the host system can directly access the portion via the requests wherein the portion includes at least two physical storage partitions associated with different storage elements each having an associated storage controller, and means, within the host system, for processing the requests of the host system to the portion in response to mapping the portion; and means for switching the requests to the portion in response to processing the requests such that the storage controller associated with each of the at least two physical storage partitions each processes part of the requests to the portion independent of the other storage controllers.

13. The system of claim 12, wherein the means for mapping includes means for generating a merged partition of the storage elements such that the requests are switched based on the merged partition.

14. The system of claim 13, further including means for privatizing an access for the host system through the merged partition to the portion of the physical storage partitions such that only the host system that generated the merged partition can access the merged partition.

15. The system of claim 12, further including means for processing the requests as read and write requests to the portion of the physical storage partitions.

16. The system of claim 12, further including means for partitioning data storage space to generate the physical storage partitions of each storage element.

17. The system of claim 12, further including means for mapping the physical storage partitions of each storage element to one or more storage volumes within each respective storage element.

18. The system of claim 12, further including means for accommodating multiple host systems.

* * * * *